(12) United States Patent
Lee et al.

(10) Patent No.: US 9,545,672 B2
(45) Date of Patent: Jan. 17, 2017

(54) CUTTING INSERT

(71) Applicant: KORLOY INC., Seoul (KR)

(72) Inventors: Sang-Yong Lee, Cheongju-si (KR);
Ki-Chan Nam, Cheongju-si (KR);
Wook-Jung Sung, Cheongju-si (KR);
Young-Jun Park, Cheongju-si (KR);
Dong-Bok Park, Cheongju-si (KR)

(73) Assignee: KORLOY INC., Seoul (KR)

( * ) Notice: Subject to any disclaimer, the term of this patent is extended or adjusted under 35 U.S.C. 154(b) by 246 days.

(21) Appl. No.: 14/402,529

(22) PCT Filed: Apr. 22, 2013

(86) PCT No.: PCT/KR2013/003380
§ 371 (c)(1),
(2) Date: Nov. 20, 2014

(87) PCT Pub. No.: WO2013/187594
PCT Pub. Date: Dec. 19, 2013

(65) Prior Publication Data
US 2015/0139745 A1    May 21, 2015

(30) Foreign Application Priority Data

Jun. 14, 2012  (KR) .......................... 10-2012-0063598

(51) Int. Cl.
*B23C 5/20*     (2006.01)
*B23B 27/16*    (2006.01)
*B23C 5/06*     (2006.01)

(52) U.S. Cl.
CPC ............. *B23B 27/1611* (2013.01); *B23C 5/06* (2013.01); *B23C 5/207* (2013.01); *B23B 2200/24* (2013.01);
(Continued)

(58) Field of Classification Search
CPC ........ B23B 27/1611; B23C 5/06; B23C 5/207; B23C 2200/12; B23C 2200/121
See application file for complete search history.

(56) References Cited

U.S. PATENT DOCUMENTS 5,052,863 A   10/1991 Satran
5,810,521 A    9/1998 Pantzar et al.
(Continued)

FOREIGN PATENT DOCUMENTS

CN   201632699 U   11/2010
JP   2001-219315 A   8/2001
(Continued)

*Primary Examiner* — Sunil K Singh
*Assistant Examiner* — Alan Synder
(74) *Attorney, Agent, or Firm* — Rabin & Berdo, P.C.

(57) ABSTRACT

The present invention relates to a cutting insert. The cutting insert, according to one embodiment of the present invention, comprises: a top surface; a bottom surface; side surfaces which connect the top surface and the bottom surface to each other; a hole which penetrates the top surface and the bottom surface; and cutting edges which are defined by the top surface and the side surfaces, wherein a main cutting edge side surface among the side surfaces is provided with a first relief surface, a transition surface extending from the first relief surface, and a second relief surface extending from the transition surface, the first relief surface is formed such that the relief angle or the relief surface width varies along the cutting edge, and the transition surface is provided with a plurality of ridges in order to reinforce the rigidity of the cutting edge.

6 Claims, 5 Drawing Sheets

(52) U.S. Cl.
    CPC .. *B23B 2200/3618* (2013.01); *B23C 2200/121* (2013.01); *B23C 2200/125* (2013.01); *B23C 2200/24* (2013.01); *B23C 2200/361* (2013.01); *Y10T 407/23* (2015.01)

(56) References Cited

U.S. PATENT DOCUMENTS

| | | |
|---|---|---|
| 6,945,740 B2 | 9/2005 | Svenningsson et al. |
| 7,972,090 B2 | 7/2011 | Jonsson et al. |
| 8,025,465 B2 * | 9/2011 | Ishida .................. B23C 5/06 407/113 |
| 2005/0111925 A1 | 5/2005 | Svenningsson et al. |
| 2009/0162154 A1 | 6/2009 | Jonsson et al. |

FOREIGN PATENT DOCUMENTS

| | | |
|---|---|---|
| KR | 10-0305458 B1 | 11/2001 |
| KR | 10-2006-0016073 A | 2/2006 |
| KR | 10-0661527 B1 | 12/2006 |
| KR | 102008010731 A | 12/2008 |
| KR | 10-2010-0103519 A | 9/2010 |

* cited by examiner

CUTTING INSERT

BACKGROUND OF THE INVENTION

1. Field of the Invention

The present invention relates to a cutting insert.

2. Description of the Related Art

Generally, a cutting insert is coupled to a cutting tool mounted on a machine tool, to be used in cutting a workpiece to be cut which consists of iron, nonferrous metals, non-metal materials, etc.

U.S. Pat. No. 5,052,863 discloses an example of the cutting insert, which discloses a cutting insert (hereinbelow, 'conventional cutting insert') as the one illustrated in FIG. 1. For reference, FIG. 1 corresponds to FIG. 6 provided by U.S. Pat. No. 5,052,863, without any modifications to the reference numerals for convenience of explanation.

To be specific, the conventional cutting insert is used as a peripheral rotary milling cutter which includes a cylindrical holder and a plurality of replaceable cutting inserts arranged along circumferential direction, in which at least one cutting edge is provided between rake surface and relief surface of the insert.

Further, the conventional cutting insert is so configured that narrow flank surface portion 24a is gradually decreased in size in a direction from the raised cutting corner edge portion to lowered cutting corner edge portion, and the relief angle is substantially not varied along a lengthwise direction of the cutting edge.

Meanwhile, high speed and high feed cutting is subject to great possibility of having excessive cutting loads on specific portion of the cutting edges depending on processing conditions, and if this happens, the cutting edges of the specific portion of the conventional cutting insert can possibly be broken. Accordingly, it is necessary to provide a cutting insert, which has increased cutting performance, and also has increased rigidity on specific portion which can be subject to excessive machining load.

DETAILED DESCRIPTION OF THE INVENTION

Technical Object

The present invention has been made to overcome the problems of the prior art discussed above, and therefore, it is an object of the present invention to provide a cutting insert with increased rigidity, but without compromising cutting performance of the cutting insert.

Further, it is an object of the present invention to provide a cutting insert with increased machining accuracy of workpiece, by exclusive application of grinding process on a specific portion of the cutting insert.

In addition to the above-mentioned objects, other objects can be achieved with the constitution of the present invention which will be explained below.

Means to Solve the Object

In order to accomplish the above-mentioned objects, the present invention provides a cutting insert, which may include a top surface, a bottom surface, side surfaces which connect the top surface and the bottom surface to each other, a hole which penetrates the top surface and the bottom surface, and cutting edges which are defined by the top surface and the side surfaces, in which a main cutting edge side surface among the side surfaces is provided with a first relief surface, a transition surface extending from the first relief surface, and a second relief surface extending from the transition surface, the first relief surface is formed such that the relief angle or the relief surface width varies along the cutting edge, and the transition surface is provided with a plurality of ridges in order to reinforce the rigidity of the cutting edge.

Further, the first relief surface may include a plurality of areas configured with a relatively greater relief angle compared to remaining areas of the first relief surface.

Further, the plurality of ridges may be formed at locations on the transition surface that correspond to locations of the plurality of areas of the first relief surface.

Further, one of the plurality of ridges may be formed at a location corresponding to an axis of the hole.

Further, the first relief surface of the main cutting edge side surface and the first relief surface of the secondary cutting edge side surface of the side surfaces may be subject to grinding process.

Further, the relief surface width may decrease as the relief angle increases.

Effect of the Invention

According to the present invention, a cutting insert has improved cutting performance by way of increased relief angle, and can also maintain rigidity by arrangement of ridges.

Further, accuracy of processing a workpiece is increased and machining load exerted on the cutting insert is decreased, by way of applying grinding process to the first relief surfaces of the main cutting edge side surface and the secondary cutting edge side surface.

Meanwhile, the effects of the present invention are not limited to those mentioned above, but other effects that can be obtained from the constitution of the present invention will be included as the effects of the present invention.

BRIEF DESCRIPTION OF THE DRAWINGS

The above and/or other aspects and advantages of the present invention will become apparent and more readily appreciated from the following detailed description, taken in conjunction with the accompanying drawings of which.

BEST MODE

Hereinbelow, a cutting insert 100 ('subject cutting insert' hereinbelow) according to one embodiment of the present invention will be explained with reference to the accompanied drawings.

Figure 1:
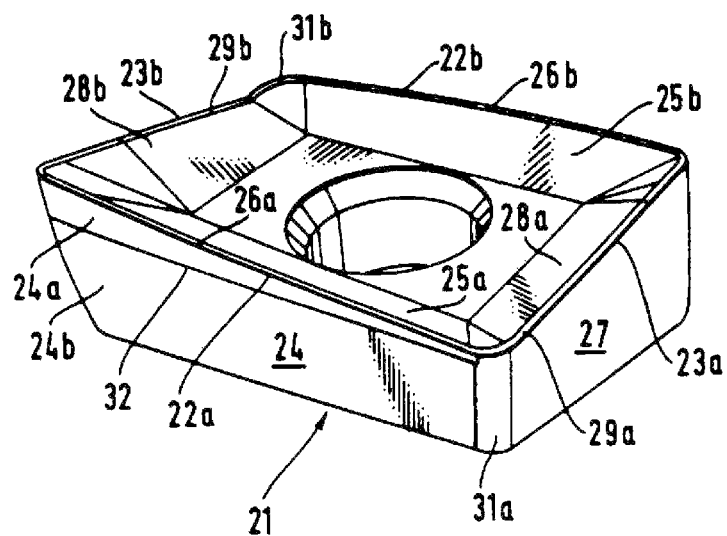
FIG. 1 illustrates side of a main cutting edge of a conventional cutting insert.
Figure 2:
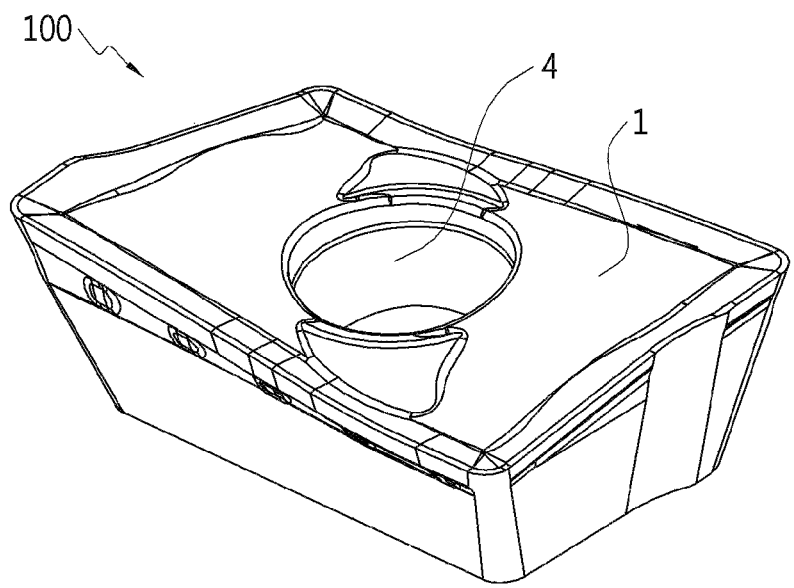
FIG. 2 is a perspective view of a cutting insert according to the present invention.
Figure 3:
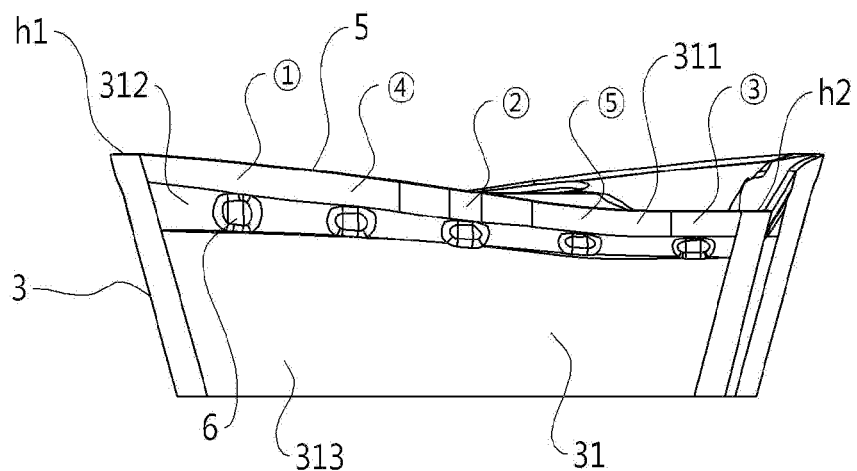
FIG. 3 is a front view of the cutting insert of FIG. 2.
Figure 4:
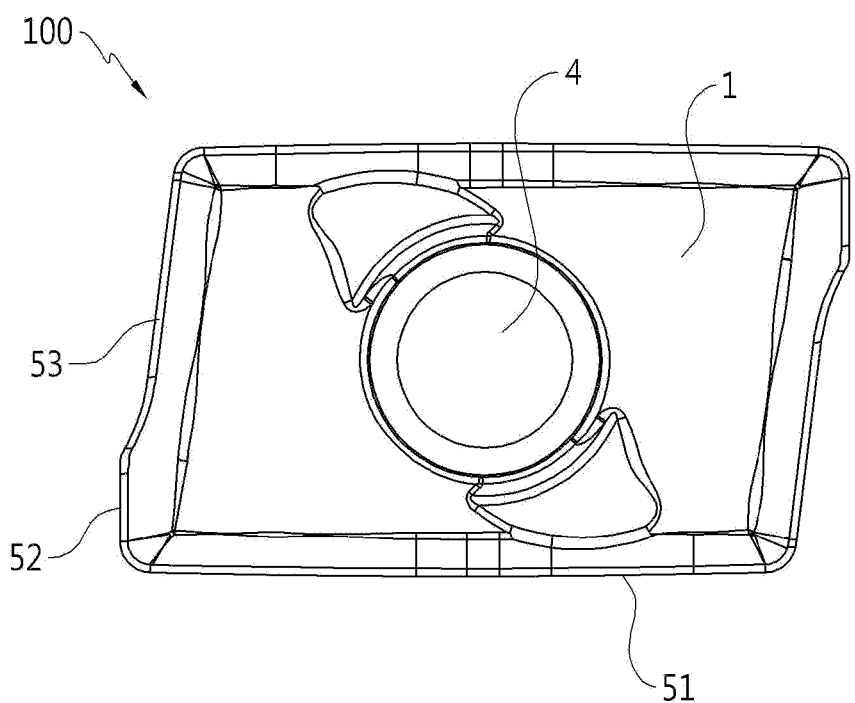
FIG. 4 is a plan view of the cutting insert of FIG. 2.
Figure 5:
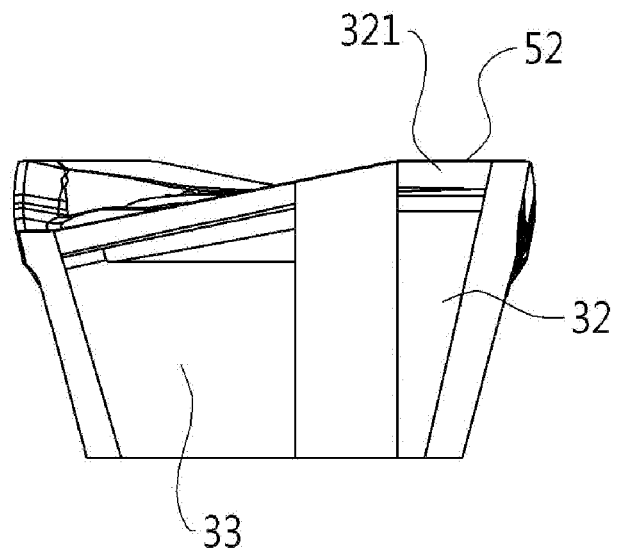
FIG. 5 is a right side view of the cutting insert of FIG. 2.
Figure 6:
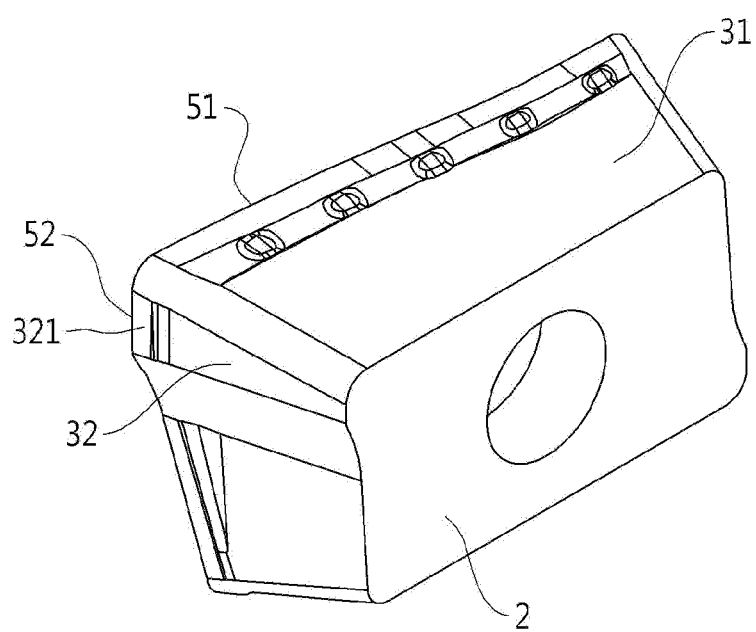
FIG. 6 is a bottom perspective view of the cutting insert of FIG. 2.

FIG. 2 is a perspective view of a cutting insert according to the present invention, FIG. 3 is a front view of the cutting insert of FIG. 2, FIG. 4 is a plan view of the cutting insert of FIG. 2, FIG. 5 is a right side view of the cutting insert of FIG. 2, and FIG. 6 is a bottom perspective view of the cutting insert of FIG. 2.

Referring to FIGS. 2 to 6, the subject cutting insert may consist of a top surface 1, a bottom surface 2, and a plurality of side surfaces 3 connecting the top and bottom surfaces 1 and 2. In one embodiment, the cutting insert may include four side surfaces including two longer side surfaces to each other, and two shorter side surfaces, which are symmetric to each other.

Figure 7:
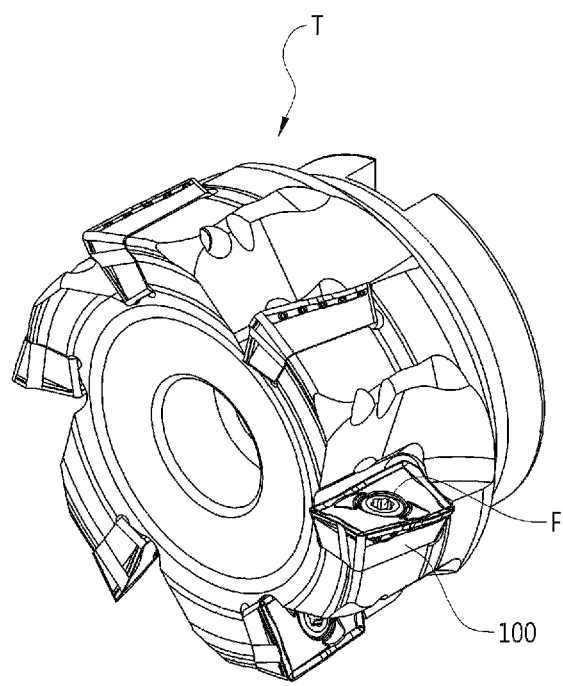
FIG. 7 illustrates the cutting insert of FIG. 2 coupled to the cutting tool.

The subject cutting insert may also include a hole 4 passing through the top and bottom surfaces 1, 2. A fastening means (F) such as bolt, etc., is seated in the cutting hole (T) (see FIG. 7).

Further, the subject cutting insert includes a cutting edge 5 formed by the top and side surfaces 1, 3. The cutting edge 5 consists of a main cutting edge 51 formed by the top surface 1 and a main cutting edge side surface 31, a secondary cutting edge 52 formed by the top surface 1 and a secondary cutting edge side surface 32, and a third cutting edge 53 formed by the top surface 1 and a third cutting edge side surface 33.

Meanwhile, among the side surfaces, the main cutting edge side surface 31 includes a first relief surface 311, a transition surface 312 extending from the first relief surface 311, and a second relief surface 313 extending from the transition surface 312.

Referring to FIG. 3, the first relief surface 311 consists of relief angle and relief surface width which are varied along the main cutting edge 51. That is, the first relief surface 311 is so configured that the relief surface is varied from a raised cutting edge portion h1 towards a lowered cutting edge portion h2.

The transition surface 312 is so arranged that its height is decreased from the raised cutting edge portion h1 towards a lowered cutting edge portion h2. The transition surface 312 allows application of separate design concept on the main relief surface 311 and the secondary relief surface 313 in consideration of machining condition, by separating the first relief surface 311 from the secondary relief surface 313.

Meanwhile, when the relief angle and the relief surface width of the main relief surface 311 are "varied" in certain area, this means that the relief surface width or relief angle stops increasing and starts decreasing, or vice versa, thus allowing the relief surface width of the main relief surface in certain area to be relatively greater in size than relief surface width of the remaining areas (i.e., allowing relief angle in certain area to be relatively smaller than that in the remaining areas), rather than meaning an occasion where the relief surface width or relief angle keeps decreasing or keeps increasing from the raised cutting edge portion h1 to the lowered cutting edge portion h2 along the main cutting edge 51.

For reference, depending on machining process, the high speed and high feed cutting process can have varied machining load exerted on the main cutting edge of the cutting insert, and it is also necessary to improve cutting performance of certain portion of the main cutting edge. However, the conventional cutting insert like the one explained above cannot efficiently deal with such demands.

According to the present invention, the subject cutting insert has a plurality of certain areas which are relatively increased in relief angle (i.e., decreased in relief surface width) compared to the remaining areas. FIG. 3 illustrates an example in which five areas (①~⑤) have relatively greater relief angle than the remaining areas. Of course, locations and number of the areas can vary appropriately, depending on machining conditions for the cutting.

Meanwhile, rigidity of corresponding areas can degrade, when these areas are increased in relief angle (or decreased in relief surface width) for the purpose of increased cutting performance. In order to prevent such from occurring, the subject cutting insert includes a plurality of ridges 6 on the transition surface 312 to reinforce rigidity of the main cutting edge 51. The ridges 6 are arranged at locations that correspond to the locations of the certain areas on the main relief surface 311 which have relatively increased relief angle (or relatively decreased relief surface width).

Referring to FIG. 3, the ridges 6 are in approximately circular shape, and slightly raised from the transition surface 312 towards a direction that is away from the ground. With such constitution, the ridges 6 can prevent degradation of rigidity due to increased relief angle on the certain areas of the main cutting edge 51. The presence of the raised ridges 6 can also provide an effect of increased surface area and subsequently increased release of heat which is generated during cutting process.

For reference, the subject cutting insert has five ridges 6, as an example. Of course, locations and number of these areas can vary appropriately, in association with the locations and number of certain areas on the main relief surface 311 which have relatively increased relief angle. However, it is preferable that the ridge (②) is arranged at a center of the transition surface 312 to prevent degradation of rigidity of the main cutting edge due to presence of the hole 4.

Meanwhile, during machining of the workpiece, the first relief surface 311 on the side of the main cutting edge 51 is brought into contact with the side surface formed on the workpiece, while the first relief surface 321 of the secondary cutting edge 52 is brought into contact with the bottom surface formed on the workpiece. Accordingly, in order to increase processing degree and decrease machining load exerted on the cutting insert during machining of the workpiece, it is preferable that these areas be fabricated with precision. To this purpose, surface roughness and fabrication precision are increased by applying grinding process to the first relief surface 311 on the side of the main cutting edge 52 side, and to the first relief surface 321 on the side of the secondary cutting edge 52 side.

For reference, because grinding process can take considerable amount of time and increased fabrication cost, it is undesirable to apply this process to the entire area of the cutting insert. Accordingly, considering the fact that, during the machining of the workpiece, the first relief surface 311 on the main cutting edge 51 side is brought into contact with the side surface formed on the workpiece, and that the first relief surface relief surface 321 on the secondary cutting edge 52 side is brought into a bottom surface formed on the workpiece, the present invention not only improves accuracy of processing of the workpiece, but also reduces machining load applied to the cutting insert, by minimizing the application of grinding process to the above-mentioned areas only. Accordingly, the present invention also provides effect of minimizing increase of manufacture cost of the cutting insert.

Figure 8:
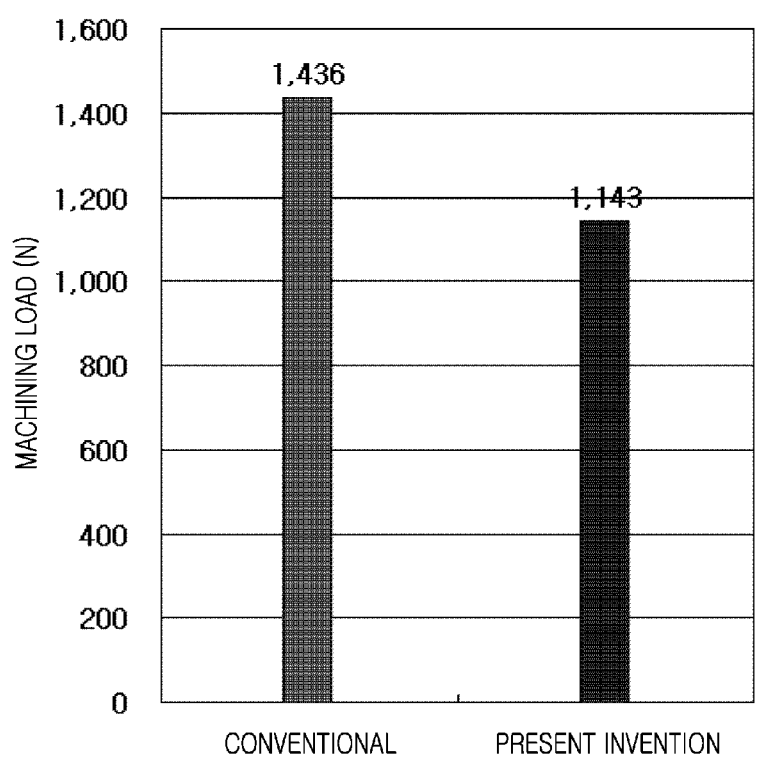
FIG. 8 illustrates machining load on the cutting insert of FIG. 2, compared with the conventional cutting insert.

FIG. 8 is a graphical representation of machining load of the cutting insert compared to the conventional cutting insert. When measured under the same machining conditions, machining load of the conventional cutting insert was approximately 1,436 N, while the machining load of the subject cutting insert was approximately 1,143 N which was approximately 20% of reduction.

Accordingly, the cutting insert can have improved cutting performance, while maintaining rigidity, by way of variably forming relief angle or relief surface width of the first relief surface and also by arranging ridges.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

INDUSTRIAL APPLICABILITY

The present invention is applicable to a cutting insert for the processing of industrial machine parts, etc.

What is claimed is:

1. A cutting insert, comprising:
a top surface; a bottom surface; side surfaces which connect the top surface and the bottom surface to each other; a hole which penetrates the top surface and the bottom surface; and cutting edges which are defined by the top surface and the side surfaces, wherein
a main cutting edge side surface among the side surfaces is provided with a first relief surface, a transition surface extending from the first relief surface, and a second relief surface extending from the transition surface,
the first relief surface is formed such that the relief angle or the relief surface width varies along the cutting edges, and
the transition surface is provided with a plurality of ridges in order to reinforce the rigidity of the cutting edges.

2. The cutting insert of claim 1, wherein the first relief surface includes a plurality of areas configured with a relatively greater relief angle compared to remaining areas of the first relief surface.

3. The cutting insert of claim 2, wherein the plurality of ridges are formed at locations on the transition surface that correspond to locations of the plurality of areas of the first relief surface.

4. The cutting insert of claim 1, wherein one of the plurality of ridges is formed at a location corresponding to an axis of the hole.

5. The cutting insert of claim 1, wherein the first relief surface of the main cutting edge side surface and the first relief surface of a secondary cutting edge side surface of the side surfaces are subject to grinding process.

6. The cutting insert of claim 1, wherein the relief surface width decreases as the relief angle increases.

* * * * *